United States Patent [19]
Wake et al.

[11] Patent Number: 5,964,113
[45] Date of Patent: *Oct. 12, 1999

[54] METHOD FOR MANUFACTURING A RESIN-COATED STEEL SHEET FOR DRAWN-AND-IRONED CANS

[75] Inventors: Ryousuke Wake; Ryoichi Yoshihara, both of Himeji; Hiroji Niimi; Takashi Hiraoka, both of Waki-cho, all of Japan

[73] Assignees: Nippon Steel Corporation; Mitsui Chemicals, Inc., both of Tokyo, Japan

[ * ] Notice: This patent is subject to a terminal disclaimer.

[21] Appl. No.: 08/962,779

[22] Filed: Nov. 3, 1997

Related U.S. Application Data

[62] Division of application No. 08/210,747, Mar. 18, 1994, Pat. No. 5,714,273, which is a continuation of application No. 07/875,593, Apr. 28, 1992, abandoned, which is a continuation of application No. 07/612,440, Nov. 14, 1990, abandoned.

[30] Foreign Application Priority Data

| Nov. 15, 1989 | [JP] | Japan | 1-296450 |
| May 10, 1990 | [JP] | Japan | 2-120408 |
| May 10, 1990 | [JP] | Japan | 2-120409 |

[51] Int. Cl.$^6$ .............. B21D 22/28; B32B 15/08
[52] U.S. Cl. .............. 72/46; 428/622; 428/626; 428/458; 220/62.22; 156/215; 427/409
[58] Field of Search ............... 72/46; 428/622, 428/623, 621, 626, 659, 666, 458; 220/62.22; 156/215; 427/398.1, 409

[56] References Cited

U.S. PATENT DOCUMENTS

| 4,362,775 | 12/1982 | Yabe et al. | 428/213 |
| 4,450,977 | 5/1984 | Colburn et al. | 220/458 |
| 4,452,374 | 6/1984 | Hitchcock et al. | 220/458 |
| 5,059,460 | 10/1991 | Heyes et al. | 428/35.3 |
| 5,272,011 | 12/1993 | Tanaka et al. | 428/418 |
| 5,714,273 | 2/1998 | Wake et al. | 428/626 |

FOREIGN PATENT DOCUMENTS

| 2431076 | 1/1975 | Germany. |
| 59-76226 | 5/1984 | Japan. |
| 2055687 | 5/1981 | United Kingdom. |
| 2181104 | 4/1987 | United Kingdom. |
| 8903304 | 4/1989 | United Kingdom. |

OTHER PUBLICATIONS

Metal Finishing Guidebook Directory, 43$^{rd}$ Annual Edition, pp. 510–513, 1975.

Mitchel Sehn and Hirumichi Kawai, "Properties and Structure of Polymeric Alloys", AlChE Journ., vol. 24, #1, Jan. 1978.

Miura et al., Chemical Abstracts, vol. No. 82, Item No. 157925w, 1975.

World Patent Index, Abstract of JP 1145137A, AN No. 89–209344, 1989.

*Primary Examiner*—David A. Simmons
*Assistant Examiner*—Linda L. Gray
*Attorney, Agent, or Firm*—Wenderoth, Lind & Ponack, L.L.P.

[57] ABSTRACT

A method of producing a resin-coated steel sheet for drawn-and-ironed cans. The resin-coated steel sheet has a steel sheet with a tin-coat on each side and a resin layer of a first crystalline thermoplastic polyester resin on one of the tin-coats and a second non-crystalline thermoplastic polyester resin on the first crystalline thermoplastic polyester resin. The first crystalline thermoplastic polyester resin has an alloying ratio of: 50≦alloying ratio<100. The second non-crystalline thermoplastic polyester resin has an alloying ratio of 0<alloying ratio<50. The method includes thermal fusion of a mixture of 95–5 percent by weight of a crystalline polyester resin and 5–95 percent of a non-crystalline polyester resin to produce the first crystalline thermoplastic polyester resin and the second non-crystalline thermoplastic polyester resin. The first crystalline thermoplastic polyester resin and the second non-crystalline thermoplastic polyester resin are coated onto the tin-coated steel sheet using two-layer extrusion T-die and then cooled quickly.

8 Claims, No Drawings

METHOD FOR MANUFACTURING A RESIN-COATED STEEL SHEET FOR DRAWN-AND-IRONED CANS

This application is a division of application, Ser. No. 08/210,747, filed Mar. 18, 1994, now U.S. Pat. No. 5,714,273, which is a continuation of now abandoned application, Ser. No. 07/875,593, filed Apr. 28, 1992, which is a continuation of now abandoned application, Ser. No. 07/612,440, filed Nov. 14, 1990.

BACKGROUND OF THE INVENTION

1. Field of the Invention

The present invention relates to a resin-coated steel sheet for drawn and ironed cans, and a drawn and ironed can manufactured therefrom.

2. Description of the Related Art

Japanese Laid-open Patent Application No. Sho-60-168643 discloses a resin coated steel sheet for drawn and ironed cans (hereinafter referred to as "DI cans") which is excellent in workability in drawing and ironing and which enables a high degree of ironing (an ironing ratio of 60% or higher) with a resin film being kept coated on the inside face of the can, and which gives, by drawing and ironing, DI cans satisfactory in resin film adhesion, corrosion resistance, and external appearance.

The resin-coated steel sheet disclosed in the above Laid-open Patent Application comprises (1) a coating layer of a thermoplastic resin such as a polyethylene terephthalate resin, being capable of orienting and having a barrier property against corrosive components, the layer being provided on one side of the steel sheet, which side forms an inside face of the DI cans; (2) an inorganic oxide film layer such as of chromium hydrate oxide provided under the coating layer as an adhering undercoating; and (3) a metal coating layer of ductile metal such as tin provided on the other side of the steel sheet which forms the outside face of the DI cans.

In order to manufacture a DI can which has a resin coating satisfactory in adhesion, corrosion resistance, and external appearance, as described in the above Laid-open Patent Application, the coating resin of the resin-coated steel sheet for DI cans is required to be brought to a suitable drawing temperature in the drawing and ironing step, (the suitable temperature being lower than the crystallization temperature of the resin, and within the range of the glass-transition temperature ($T_g$) ±30° C., e.g., 40 to 100° C. for a PET resin. Since the resin-coated steel sheets, which are produced by a known extrusion-lamination method (T-die method) and subjected to the drawing and ironing, are usually stored at a normal temperature, a preheating process for the resin-coated steel sheets is required, disadvantageously adding to the conventional can-manufacturing process.

SUMMARY OF THE INVENTION

The present invention intends to provide a resin-coated steel sheet which has excellent workability in drawing and ironing even at a normal temperature without preheating, and is capable of being ironed in a high degree of ironing (an ironing ratio of 60% or more) while the resin is kept coated on the inside face, and which gives, by drawing and ironing, DI cans having resin coating satisfactory in adhesion, corrosion resistance, and external appearance.

The present invention also intends to provide a DI can having the aforementioned characteristics.

According to one aspect of the present invention, there is provided a resin-coated steel sheet for DI cans, comprising a steel sheet having a tin coating on one side and a chromate-treated surface on the other side, the chromate-treated surface being further coated with a resin composition composed of a thermoplastic polyester resin, the polyester resin having been prepared by thermal fusion reaction of 95 to 5% by weight of a crystalline polyester and 5 to 95% by weight of a non-crystalline polyester and having an alloying ratio, represented by the formulas below, of 5 to 50%.

$$\frac{T_{m1} - T_{m3}}{T_{m1} - T_{m2}} = \text{Alloying ratio}$$

or $$\frac{T_{g1} - T_{g3}}{T_{g1} - T_{g2}} = \text{Alloying ratio}$$

where $T_{m1}$ and $T_{g1}$ are respectively a melting point, and a glass-transition temperature, in ° C., of the crystalline polyester resin employed as the starting material; $T_{m2}$ and $T_{g2}$ are respectively a melting point and a glass-transition temperature, in ° C., of the completely reacted product of a thermal-fusion reaction of the crystalline polyester resin with the non-crystalline resin employed as the starting materials, or in other words a melting point and a glass-transition temperature of a random copolymer of the polyester resin having the same monomer composition; $T_{m3}$ and $T_{g3}$ are respectively a melting point and a glass-transition temperature, in ° C., of the a thermoplastic polyester resin.

According to another aspect of the present invention, there is provided a resin-coated steel sheet for DI cans, comprising a steel sheet tin-coated on both sides, one side of the sheet being further coated with a resin composition composed of a thermoplastic polyester resin, the polyester resin having been prepared by a thermal fusion reaction of 95 to 5% by weight of a crystalline polyester with 5 to 95% by weight of non-crystalline polyester and having an alloying ratio, represented by the formulas above, of 20 to 80%.

According to still another aspect of the present invention, there is provided a resin-coated steel sheet for DI cans, comprising a steel sheet tin-coated on both sides, one side of the sheet being coated with a non-crystalline polyester resin layer, and the non-crystalline polyester resin layer being further coated with a resin layer composed of a thermoplastic polyester resin, the polyester resin having been prepared by a thermal fusion reaction of a crystalline polyester with non-crystalline polyester and having an alloying ratio, represented by the formulas above, of less than 50% (excluding 0%).

According to a further aspect of the present invention there is provided a resin-coated steel sheet for DI cans, comprising a steel sheet tin-coated on both sides, one side of the sheet being coated with a resin layer composed of a thermoplastic polyester resin, the polyester resin having been prepared by a thermal fusion reaction of a crystalline polyester with a non-crystalline polyester and having an alloying ratio, represented by the formulas above, of not less than 50% and less than 100%, and the resin layer being further coated with another resin layer composed of a crystalline polyester resin.

According to a still further aspect of the present invention there is provided a resin-coated steel sheet for DI cans, comprising a sheet tin-coated on both sides, one side of the steel sheet being coated with a resin layer composed of a first thermoplastic polyester resin, the first polyester resin having been prepared by a thermal fusion reaction of a crystalline polyester with a non-crystalline polyester and having an alloying ratio, represented by the formulas above, of not less than 50% and less than 100%, the resin layer being further coated with another resin layer composed of a second thermoplastic polyester resin, the second polyester resin having been prepared by a thermal fusion reaction of a crystalline polyester with non-crystalline polyester and having an alloying ratio, represented by the formulas above, of less than 50% (excluding 0%).

According to a still further aspect of the present invention, there is provided a drawn and ironed can, produced by drawing and ironing the aforementioned resin-coated steel sheet for DI cans to process the resin-coated side into the inside of the can.

The values of $T_{m1}$, $T_{m2}$, $T_{m3}$, $T_{g1}$, $T_{g2}$, and $T_{g3}$ are respectively a melting point or a glass-transition temperature, measured by a differential thermal analyzer (Perkin Elmer, Model 7) at a programmed temperature elevation of 10° C./min. Regarding the definition of "crystalline state" and "non-crystalline state", a polyester exhibiting a peak of the melting point is defined as being crystalline, and a polyester exhibiting only the peak of the glass-transition temperature or exhibiting neither a peak of the glass-transition temperature nor a peak of the melting point is defined as being non-crystalline.

The above-mentioned crystalline polyester includes polyethylene terephthalate (hereinafter referred to as PET), polybutylene terephthalate (hereinafter referred to as PBT), polyethylene naphthalate (hereinafter referred to as PEN), and copolymers thereof, but is not limited thereto. Thermoplastic polyesters having a melting point of 200° C. or higher are included in the crystalline polyester.

The above-mentioned non-crystalline polyester includes polyethylene isophthalate (hereinafter referred to as PEI), polyethylene terephthalate copolyester comprising 30 mole % of cyclohexane-dimethanol, polyethylene terephthalate comprising 20 mole % or more of isophthalic acid, polyarylate, polyester-polycarbonate, and the like, but is not limited thereto. Non-crystalline thermoplastic polyesters having a glass-transition temperature of 20° C. or higher, preferably 40° C. or higher are included thereto.

DETAILED DESCRIPTION OF THE INVENTION

The present invention will be described in detail.

The first and the second aspects of the present invention are explained below.

Cans were manufactured by coating a variety of thermoplastic resins on a chromate-treated surface of a known surface-treated steel sheet having a tin coated surface on one side for the outside wall of the can, and the chromated-treated surface on the other side for the inside wall of the can, or on one side of a known surface-treated steel sheet having tin coating on both sides prepared according to a known method, and subsequently drawing and ironing the steel sheets thus resin-coated, with the resin-coated surface forming the inside of the can.

Firstly, a known PET was selected as the thermoplastic resin. Further, a known resin in an amorphous state was employed. As a result, the resin-coated steel sheet prepared by a known method could be drawn and ironed only to a low degree, but could not be worked to an ironing ratio of 60% or higher, the object of the present invention. The reason was presumed to be that the usual non-crystalline PET singly used crystallizes partially during drawing and ironing, resulting in non-workability in the subsequent processing.

Accordingly, the same working was conducted similarly by using PEI as the non-crystallizable polyester resin. This PEI, which was non-crystallizable as, expected, exhibited superior characteristics in the drawing step. However, in the subsequent ironing, the resin adheres to the working punch, (in ironing, usually a metal sheet is pressed into three dies to conduct ironing between the punch and the die), causing exfoliation of the resin from the inside wall of the can and preventing removal (or strip-out) of the punch from the can body.

Further, similar drawing-and-ironing working (hereinafter referred to as DI working) was conducted with a simple mixture of PET and PEI, or of PET, PEI, and PBT with unsatisfactory results. That is, the resin containing a predominant proportion of a crystalline resin is unsatisfactory in workability, while the resin containing a predominant proportion of a non-crystalline resin was unsatisfactory in strip-out property. None of the binary or ternary mixtures of these components satisfied simultaneously the workability and strip-out property.

Then it was considered that a simple composition of PET or PEI, as well as simple mixtures thereof, show the properties of the respective single components even though some degree of transesterification may occur on fusion of the resins. Therefore, copolymer resins of terephthalate and isophthalate were prepared, and tested in the same manner, leading to unsatisfactory results. However, in a very limited resin composition range, the copolymer resins of terephthalate with isophthalate exhibited characteristics near the target, so that the results were analyzed in detail. Consequently, it was concluded that the control of the crystallinity only of the resin, as known before, gives neither the desired adhesiveness to the metal nor the desired workability for severe DI working, but the control of the melting point together with the crystallinity is indispensable. In other words, it was found that the resin composition which crystallizes only minimally in DI working in a non-crystalline state and has a melting point within a suitable temperature range can satisfy the object of the present invention.

It was also found that the resin compositions having such characteristics can be prepared by heat fusion of 95–5% by weight of PET, namely a crystalline polyester, and 5–95% by weight of PEI, namely a non-crystalline polyester in such a state that at least one of the crystalline polyester and the non-crystalline polyester is catalytically active, and controlling the alloying ratio to come within a predetermined range. The optimum range of the alloy ratio depends on the nature of the surface to be coated with the resin composition: the ratio being from 5 to 50% for a chromate-treated surface, and from 20 to 80% for a tin-coated surface.

The state of being "catalytically active" means that the starting polyester comes to have a higher molecular weight (or a higher limiting viscosity) when heated. The use of such starting material having the catalytic activity will shorten the time for alloying.

The reasons for the numerical limitations in the first and the second aspects of the present invention are discussed below.

In alloying the crystalline polyester with the non-crystalline polyester, the mixing ratio, [(non-crystalline polyester/whole polyester resin)×100], is limited to be within a range of from 5% to 95%. The mixing ratio is limited to be not less than 5% because, at the ratio of less than 5%, the crystalline resin exerts great influence on the crystallization of the resin under the severe ironing condition by stretching, making the resin non-workable. On the other hand, the mixing ratio is limited to be not more than 95% because, at the ratio of more than 95%, the apparent melting point is 235° C. or lower to cause adhesion of the resin by fusion to the punch, impairing the strip-out property.

Of the thermoplastic polyester resin for coating a chromate-treated surface, the alloying ratio is limited to be from 5 to 50% because, at the alloying ratio of less than 5%, the crystalline portion increases by the heat generated in the ironing and other steps, making the resin incapable of following the high rate of ironing, and at the alloying ratio of more than 50%, the apparent melting point of the coating resin becomes lower, impairing greatly the strip-out property.

Of the thermoplastic polyester resin for coating a tin-coated surface, the alloying ratio is limited to be from 20 to 80% because, at the alloying ratio of less than 20%, the crystalline portion increases by the heat generated in the ironing and other steps, making the resin incapable of following the high rate of ironing, and at the alloying ratio of more than 80%, the apparent melting point of the coating resin becomes lower, impairing greatly the strip out property.

The reason why the lower limit of the optimum alloying ratio of the resin is lower for a chromate-treated surface than for a tin-coated surface is assumed to be that the resins adhere more tightly to the tin-coated surface. The reason why the upper limit of the optimum alloying ratio of the resin is higher for a tin-coated surface than for a chromate-treated surface is assumed to be that the working heat generated at ironing on the outside face of the can is absorbed as the heat of fusion of the tin coating layer on the inside face of the can, reducing the temperature rise of the resin of the tin coating layer and, on the contrary, the temperature rise is not reduced on the chromate-treated surface.

Next, the third, the fourth, and the fifth aspects of the invention are explained below.

As described before, cans were manufactured by coating one side of a known steel sheet having tin coating on both sides with a variety of thermoplastic resins by a known method and drawing and ironing the thus coated steel sheet so that the resin-coated side forms the inside of the can. Consequently, it was confirmed that the workability and the strip-out property depend on the coating thermoplastic resin: the workability being low with PET; the strip-out property being inferior with PEI; PET and PEI not giving a steel sheet satisfying both of the workability and the strip-out property; the mixture of PET and PEI, or PET, PEI and PBI giving inferior workability at a higher content of the crystalline resin, and giving inferior strip-out property at a higher content of the non-crystalline resin; and an arbitrary mixture of these two or three components giving no steel sheet satisfying both workability and strip-out property.

Accordingly, the idea came to the inventors to laminate the non-crystalline polyester resin layer having high workability (and high adhesiveness) onto a tin coating layer of the steel sheet and to laminate further thereon a crystalline polyester resin layer having a satisfactory strip-out property. Therefore, drawing and ironing workability was investigated by using various non-crystalline polyester resins and crystalline polyester resins. However, in every combination, layer separation occurred between the lower non-crystalline polyester resin layer and the upper crystalline polyester resin layer.

Since the phenomenon was assumed to come from the large difference of the properties between the lower resin layer and the upper resin layer, the resin compositions of the upper layer and the lower layer were improved to prevent the layer separation between the upper and the lower resin layers and to secure the workability and the strip-out property of the resin.

More specifically:
(1) in the case where a non-crystalline polyester resin giving satisfactory workability (or adhesiveness) is employed for the lower layer, a special resin which crystallizes appropriately by resin-stretching at the working is employed for the upper layer resin to decrease the difference of the properties between the upper and the lower resin layers, thereby preventing separation between the upper and the lower resin layers and securing the strip-out property at the working;
(2) in the case where a crystalline resin giving satisfactory strip-out property is employed for the upper layer, a special resin which minimally crystallizes by resin-stretching at the working is employed for the lower layer resin to decrease the difference of the properties between the upper and the lower resin layers, thereby preventing separation between the upper and the lower resin layers and securing the workability of the resin; and further
(3) the special resin of the above item (1) which crystallizes appropriately by resin-stretching at the working is employed for the upper layer resin, and the special resin of the above item (2) which minimally crystallizes by resin stretching at the working is employed for the lower layer resin, thereby decreasing the difference of the properties between the upper and the lower resin layers, and preventing separation between the upper and the lower resin layers to secure the workability of the resin and the strip-out property at the working.

The special resin for the upper layer resin which crystallizes appropriately is a thermoplastic resin of an incomplete reaction product of a crystalline polyester resin with a non-crystalline polyester resin, and has an alloying ratio of 50% or less (excluding 0%) defined by the aforementioned calculation formula.

The special resin for the lower layer resin which crystallizes minimally is a thermoplastic resin of an incomplete reaction product of a crystalline polyester resin with a non-crystalline polyester resin, and has an alloying ratio of not less than 50% and less than 100% defined by the aforementioned calculation formula.

Incidentally, the thermoplastic polyester resin of alloying ratio of 100% is a non-crystalline polyester resin, and the thermoplastic polyester resin of alloying ratio of 0% is a crystalline resin.

The reasons for the numerical limitations in the third, fourth, and fifth aspects of the present invention are discussed below.

The alloying ratio of the thermoplastic polyester resin for the lower layer in contact with the tin coating layer of the steel sheet is limited to be not less than 50% and less than 100% because, at the alloying ratio of less than 50%, the adhesiveness of the resin to the tin coating layer is insufficient and the crystalline portion in the coating resin increases in ironing, especially at an ironing rate of 65% or higher, resulting in loss of adhesiveness to the coating layer and of workability of the resin; and at the alloying ratio of 100%, the thermoplastic polyester resin is non-crystalline which cannot prevent the separation of the upper and the lower resin layers.

The alloying ratio of the thermoplastic polyester resin for the upper layer to be brought into contact with the punch at ironing is limited to be less than 50% (excluding 0%), because, at the alloying ratio of 50% or higher, a non-crystalline portion predominates in the coating resin, lowering the apparent melting temperature to impair the strip-out property, while a thermoplastic polyester resin of alloying ratio of 0% is crystalline which cannot prevent the separation between the upper and the lower resin layers.

In the thermal fusion reaction of a crystalline polyester resin with a non-crystalline polyester resin for alloying, the mixing ratio, [(weight of non-crystalline polyester resin/weight of whole polyester resin)×100], is preferably in the range of from 50% to 90% for producing a thermoplastic polyester resin of an alloying ratio of not less than 50% and less than 100% for the lower layer; and is preferably in the range of from 10% to 50% for producing a thermoplastic polyester resin of an alloying ratio of less than 50% (excluding 0%), in view of the production efficiency.

The coating thicknesses (or lamination thickness) of the upper and the lower resin layers, and the tin coating thickness of the steel sheet are not limited at all, and the thicknesses may be selected suitably depending on the working conditions. According to the results of the practice of the inventors of the present invention, in the cases where the tin coating thickness is 2.8 g/m² or more and the overall ironing ratio is 60% or more, the thickness of the upper layer need be not less than 3 μm before the working. If the thickness is less than 3 μm, in that case, a portion of the lower layer resin is fusion-bonded to the punch by the heat generated at DI working, thus impairing the strip-out property.

DESCRIPTION OF THE PREFERRED EMBODIMENTS

The present invention is described specifically referring to Examples.

EXAMPLES FOR THE FIRST ASPECT

A steel sheet (0.30 mm thick, hardness: equivalent to T-1) was employed which had been tin-coated in an amount of 2.8 g tin/m² on the side of the sheet for an outside face of a can, and had been chromate-treated in an amount of 55 mg metallic chromium/m² and 18 mg chromium oxide/m² on the side for an inside face of a can. The chromate-treated side of the steel sheet was coated with the resin composition shown in Table 1 in a thickness of 50 μm by means of a T-die. In the coating practice, the resin fusion temperature was in the range of from 265° C. to 300° C., and the temperature of the steel sheet during the coating was in the range of from 150° C. to 200° C. The steel sheet having been coated with the resin by the T-die was cooled quickly to 100° C. or lower within 10 seconds after the coating. The quick cooling was conducted for the purpose of preventing crystallization of the resin at a high temperature.

The resin-coated steel sheet thus produced was drawn and ironed into a can with the resin-coated side forming the inside of the can. The nondefectiveness of the inside face (the resin coated side) of the can thus manufactured was evaluated by putting aqueous 1.0% sodium chloride into the can, applying a voltage of +6 volts employing the can body as an anode and platinum placed at the center position of the can as the cathode, and measuring the electric current. (The test is hereinafter referred to as a QTV test.) The nondefectiveness of the inside face of the can was further evaluated by putting into the can a solution containing 20 g of sulfuric acid per liter and 50 g of copper sulfate ($CuSO_4 \cdot 7H_2O$) per liter, leaving it standing for 10 minutes, removing the solution from the can, washing the can with water, and observing the deposition of copper. (The solution is a chemical copper-plating solution. A defect of the resin layer will induce dissolution of iron from the defect if any, causing substitution-plating of copper. The test is hereinafter referred to as a copper sulfate test.)

The results are shown in Table 2 together with the evaluation results of the strip-out property and the observation results of the inside face of the can after the DI working.

(Working Conditions)
1. Resin temperature just before DI working:
   Normal temperature
2. Blank diameter: 137 mm in diameter
3. Drawing conditions:
   First drawing ratio H/D=33/86 mm in diameter
   Second drawing ratio H/D=50/65 mm in diameter
4. Diameter of ironing punch:
   Three-step ironing: 65.5 mm in diameter
5. Overall ironing ratio: 70.5%

TABLE 1

| | Composition of Thermoplastic Polyester Resin | | | | | | | | | Alloying Ratio |
|---|---|---|---|---|---|---|---|---|---|---|
| | Crystalline | | Non-Crystalline | | Peak Temperature in DSC (° C.) | | | | | |
| | Polyester | | Polyester | | $T_{m1}$ | $T_{m2}$ | $T_{m3}$ | $T_{g1}$ | $T_{g2}$ | $T_{g3}$ | calcd. (%) |
| Example 1 | J-125(*1) | 80 wt % | A(*2) | 20 wt % | 255 | 235 | 249.7 | — | — | — | 26.5 |
| Example 2 | J-125(*1) | 60 wt % | A(*2) | 40 wt % | — | — | — | 76.0 | 72.2 | 75.7 | 7.9 |
| Example 3 | J-125(*1) | 60 wt % | B(*3) | 40 wt % | 255 | 230 | 243.7 | — | — | — | 45.2 |
| Example 4 | J-125(*1) | 60 wt % | C(*4) | 40 wt % | — | — | — | 76.0 | 90.0 | 76.8 | 5.7 |
| Example 5 | J-125(*1) | 40 wt % | A(*2) | 60 wt % | | | — | 76.0 | 70.4 | 75.3 | 12.5 |
| Comparative Example 1 | J-240(*5) | 100 wt % | — | — | — | — | — | — | — | — | — |
| Comparative Example 2 | J-125(*1) | 78 wt % | D(*6) | 22 wt % | — | — | — | 76.0 | 72.2 | 75.9 | 2.6 |
| Comparative Example 3 | — | — | A(*2) | 100 wt % | — | — | — | — | — | 68.0 | — |
| Comparative Example 4 | J-125(*1) | 100 wt % | — | — | — | — | — | 76.0 | — | — | — |

TABLE 1-continued

| | Composition of Thermoplastic Polyester Resin | | | | Peak Temperature in DSC (° C.) | | | | | | Alloying Ratio |
|---|---|---|---|---|---|---|---|---|---|---|---|
| | Crystalline Polyester | | Non-Crystalline Polyester | | $T_{m1}$ | $T_{m2}$ | $T_{m3}$ | $T_{g1}$ | $T_{g2}$ | $T_{g3}$ | calcd. (%) |
| Comparative Example 5 | J-125(*1) | 90 wt % | A(*2) | 10 wt % | 255 | 238 | 245.8 | — | — | — | 54.1 |

DSC: Differential Thermal Analyzer, Perkin Elmer Model 7
*1 J-125: Crystalline Polyester (inherent viscosity 0.75 dl/g) made by Mitsui Pet K.K.
*2 A: Non-Crystalline Polyester (IA/TA/EG = 50/50/100 mole %, inherent viscosity 0.85 dl/g)
*3 B: Copolyester (TA/CHDM/EG = 100/30/70 mole %, inherent viscosity 0.80 dl/g) made by Eastman Kodak
*4 C: Polyester Polycarbonate (PC component 25 mole %, inherent viscosity 1.0 dl/g) made by Bayer Co.
*5 J-240: Low-Crystalline Copolyester (IA/TA/EG = 10/90/100 mole %, inherent viscosity 0.75 dl/g) made by Mitsui Pet K.K.
*6 D: Non-Crystalline Copolyester (IA/TA/EG = 90/10/100 mole %, inherent viscosity 0.85 dl/g)

TABLE 2

| | Strip-Out Property (Adhesion of Resin to Punch and Releasability of Can) | Inside Face Observed after DI Working | QTV Value mA/can | Copper Sulfate Test (Copper Deposition Observed) | Overall Evaluation |
|---|---|---|---|---|---|
| Example 1 | Good | Good | 0.5 | None | ◯ |
| Example 2 | Good | Good | 0.2 | None | ◯ |
| Example 3 | Good | Good | 0.2 | None | ◯ |
| Example 4 | Good | Good | 0.2 | None | ◯ |
| Example 5 | Good | Good | 1.1 | None | ◯ |
| Comparative Example 1 | Good | Bad | 50.0 | Yes | X |
| Comparative Example 2 | Good | Bad | 13.0 | Yes | X |
| Comparative Example 3 | Bad | Good | 25.0 | Yes | X |
| Comparative Example 4 | Good | Bad | 65.0 | Yes | X |
| Comparative Example 5 | Good | Bad | 5.0 | Yes | X |

◯: Excellent
X: Bad (Examples for the Second Aspect of the Invention)

A steel sheet (0.30 mm thick, hardness: equivalent to T-1) was employed which had been tin-coated on both sides, having a tin coating of 2.8 g/m² on each side. One side of the tin-coated steel sheet was coated with the resin compositions shown in Table 3 in a thickness of 50 μm by means of a T-die. In the coating practice, the resin fusion temperature was in the range of from 265° C. to 300° C., and the temperature of the steel sheet during the coating was in the range of from 150° C. to 200° C. The steel sheet coated with the resin by the T-die was cooled quickly to 100° C. or lower within 10 seconds after the coating. The quick cooling was conducted for the purpose of preventing crystallization of the resin at a high temperature and maintaining the resin in a non-crystalline condition.

The resin-coated steel sheet thus produced was drawn and ironed into a can with the resin-coated side forming the inside of the can. The nondefectiveness of the inside face (the resin coated side) of the can thus manufactured was evaluated by putting aqueous 1.0% sodium chloride into the can, applying a voltage of +6 volts employing the can body as an anode and platinum placed at the center position of the can as the cathode, and measuring the electric current. (The test is hereinafter referred to as a QTV test.) The nondefectiveness of the inside face of the can was further evaluated by putting into the can a solution containing 20 g of sulfuric acid per liter and 50 g of copper sulfate ($CuSO_4 \cdot 7H_2O$) per liter, leaving it standing for 10 minutes, removing the solution from the can, washing the can with water, and observing the deposition of copper. (The solution is a chemical copper-plating solution. A defect of the resin layer will induce dissolution of iron from the defect if any, causing substitution-plating of copper. The test is hereinafter referred to as a copper sulfate test.)

The results are shown in Table 4 together with the evaluation results of the strip-out property and the observation results of the inside face of the can after the DI working.

(Working Conditions)

1. Resin temperature just before DI working:

Normal temperature

2. Blank diameter: 137 mm in diameter

3. Drawing conditions:

First drawing ratio H/D=33/86 mm in diameter

Second drawing ratio H/D=50/65 mm in diameter

4. Diameter of ironing punch:

Three-step ironing: 65.5 mm in diameter

5. Overall ironing ratio: 70.5%

TABLE 3

| | Composition of Thermoplastic Polyester Resin | | | | Peak Temperature in DSC (° C.) | | | | | | Alloying Ratio |
|---|---|---|---|---|---|---|---|---|---|---|---|
| | Crystalline Polyester | | Non-Crystalline Polyester | | $T_{m1}$ | $T_{m2}$ | $T_{m3}$ | $T_{g1}$ | $T_{g2}$ | $T_{g3}$ | calcd. (%) |
| Example 1 | J-125(*1) | 85 wt % | A(*2) | 15 wt % | 255 | 240 | 251.1 | — | — | — | 21.5 |
| Example 2 | J-125(*1) | 80 wt % | A(*2) | 20 wt % | 255 | 235 | 249.7 | — | — | — | 26.5 |
| Example 3 | J-125(*1) | 60 wt % | B(*3) | 40 wt % | 255 | 230 | 243.7 | — | — | — | 45.2 |
| Example 4 | J-125(*1) | 40 wt % | A(*2) | 60 wt % | — | — | — | 76.0 | 70.0 | 72.1 | 65.0 |
| Example 5 | J-125(*1) | 20 wt % | A(*2) | 80 wt % | — | — | — | 76.0 | 69.0 | 70.5 | 78.0 |
| Comparative Example 1 | J-240(*4) | 100 wt % | — | 0 wt % | — | — | — | — | — | — | — |
| Comparative Example 2 | J-125(*1) | 60 wt % | A(*2) | 40 wt % | 255 | 215 | 221 | — | — | — | 85.0 |
| Comparative Example 3 | J-125(*1) | 60 wt % | A(*2) | 40 wt % | 255 | 215 | 249 | — | — | — | 15.0 |
| Comparative Example 4 | J-125(*1) | 40 wt % | A(*2) | 60 wt % | — | — | — | 76.0 | 70.0 | 75.4 | 10.0 |

DSC: Differential Thermal Analyzer, Perkin Elmer Model 7
*1 J-125: Crystalline Polyester (inherent viscosity 0.75 dl/g) made by Mitsui Pet K.K.
*2 A: Non-Crystalline Polyester (IA/TA/EG = 50/50/100 mole %, inherent viscosity 0.85 dl/g)
*3 B: Copolyester (TA/CHDM/EG = 100/30/70 mole %, inherent viscosity 0.80 dl/g) made by Eastman Kodak
*4 J-240: Low-Crystalline Copolyester (IA/TA/EG = 10/90/100 mole %, inherent viscosity 0.85 dl/g) made by Mitsui Pet K.K.

TABLE 4

| | Strip-Out Property (Adhesion of Resin to Punch and Releasability of Can) | Inside Face Observed after DI Working | QTV Value mA/can | Copper Sulfate Test (Copper Deposition Observed) | Overall Evaluation |
|---|---|---|---|---|---|
| Example 1 | Good | Good | 0.9 | None | ○ |
| Example 2 | Good | Good | 0.5 | None | ○ |
| Example 3 | Good | Good | 0.4 | None | ○ |
| Example 4 | Good | Good | 0.2 | None | ○ |
| Example 5 | Good | Good | 0.2 | None | ○ |
| Comparative Example 1 | Bad | Bad | 50.0 | Yes | X |
| Comparative Example 2 | Bad | Not Good | 13.0 | Yes | X |
| Comparative Example 3 | Good | Bad | 25.0 | Yes | X |
| Comparative Example 4 | Good | Not Good | 5.0 | Yes | X |

○: Excellent
X: Bad (Examples for the Third to Fifth Aspects of the Invention)

A steel sheet (0.30 mm thick, hardness: equivalent to T–1) was employed which had been tin-coated on both sides, having a tin coating of 2.8 g/m² on each side. One side of the tin-coated steel sheet was coated with the thermoplastic polyester resins shown in Table 5 by means of a two-layer extrusion T-die in a thickness of the lower layer of 20 μm and a thickness of the upper layer of 20 μm (40 μm in total). The resin fusion temperature was in the range of from 265° C. to 300° C., and the temperature of the steel sheet during the coating was in the range of from 150° C. to 200° C. The steel sheet having been coated with the resin by the T-die was cooled quickly to 100° C. or lower within 10 seconds after the coating. The quick cooling was conducted for the purpose of preventing crystallization of the resin at a high temperature and maintaining the resin in a non-crystalline condition.

The resin-coated steel sheet thus produced was drawn and ironed into a DI can with the resin-coated side forming the inside of the can. The nondefectiveness of the inside face (the resin coated side) of the can thus manufactured was evaluated by putting aqueous 1.0% sodium chloride into the can, applying a voltage of +6 volts employing the can body as an anode and platinum placed at the center position of the can as the cathode, and measuring the electric current. (The test is hereinafter referred to as a QTV test.) The nondefectiveness of the inside face of the can was further evaluated by putting into the can a solution containing 20 g of sulfuric acid per liter and 50 g of copper sulfate ($CuSO_4.7H_2O$) per liter, leaving it standing for 10 minutes, removing the solution from the can, washing the can with water, and observing the deposition of copper. (The solution is a chemical copper-plating solution. A defect of the resin layer will induce dissolution of iron from the defect if any, causing substitution-plating of copper. The test is hereinafter referred to as a copper sulfate test.) The results are shown in Table 6 together with the evaluation results of the strip-out property and the observation results of the inside face of the can after the DI working.

(Working Conditions)
1. Resin temperature just before DI working:
   Normal temperature
2. Blank diameter: 137 mm in diameter
3. Drawing conditions:
   First drawing ratio H/D=33/86 mm in diameter
   Second drawing ratio H/D=50/65 mm in diameter
4. Diameter of ironing punch:
   Three-step ironing: 65.5 mm in diameter
5. Overall ironing ratio: 70.5%

As described above, the resin-coated steel sheet for DI cans produced by employing the thermoplastic polyester resin composition of the present invention gives DI cans having excellent inside face properties even when drawn and ironed at a normal temperature. Accordingly, the preheating process in can manufacturing may be omitted, which process has conventionally been indispensable for DI cans employing conventional thermoplastic resins, which allows reduction of cost in can manufacturing.

TABLE 5

| | Resin Layer | Composition of Thermoplastic Polyester Resin | | | | Peak Temperature in DSC (° C.) | | | | | | Alloying Ratio calcd. (%) |
| | | Crystalline Polyester | | Non-Crystalline Polyester | | $T_{m1}$ | $T_{m2}$ | $T_{m3}$ | $T_{g1}$ | $T_{g2}$ | $T_{g3}$ | |
|---|---|---|---|---|---|---|---|---|---|---|---|---|
| Example 1 | Lower | J-125(*1) | 30 wt % | C(*2) | 70 wt % | — | — | — | 76 | 70 | 72.9 | 51.0 |
| | Upper | J-125(*1) | 80 wt % | C(*2) | 20 wt % | 255 | 235 | 249.7 | — | — | — | 26.5 |
| Example 2 | Lower | J-125(*1) | 15 wt % | C(*2) | 85 wt % | — | — | — | 76 | 68 | 70.4 | 75.0 |
| | Upper | J-125(*1) | 80 wt % | C(*2) | 20 wt % | 255 | 235 | 249.7 | — | — | — | 26.5 |
| Example 3 | Lower | — | — | C(*2) | 100 wt % | — | — | — | — | — | — | — |
| | Upper | J-125(*1) | 80 wt % | C(*2) | 20 wt % | 255 | 235 | 249.7 | — | — | — | 26.5 |
| Example 4 | Lower | J-125(*1) | 80 wt % | C(*2) | 20 wt % | — | — | — | 76 | 69 | 71.8 | 60.0 |
| | Upper | J-125(*1) | 100 wt % | — | — | — | — | — | — | — | — | — |
| Example 5 | Lower | J-125(*1) | 20 wt % | C(*2) | 80 wt % | — | — | — | 76 | 69 | 71.8 | 60.0 |
| | Upper | J-125(*1) | 80 wt % | C(*2) | 20 wt % | 255 | 235 | 249.7 | — | — | — | 26.5 |
| Example 6 | Lower | J-125(*1) | 20 wt % | C(*2) | 80 wt % | — | — | — | 76 | 69 | 71.8 | 60.0 |
| | Upper | J-125(*1) | 60 wt % | D(*3) | 40 wt % | 255 | 235 | 243.7 | — | — | — | 45.2 |
| Comparative Example 1 | Lower | J-240(*4) | 100 wt % | — | — | — | — | — | — | — | — | — |
| | Upper | J-240(*4) | 100 wt % | — | — | — | — | — | — | — | — | — |
| Comparative Example 2 | Lower | J-125(*1) | 80 wt % | C(*2) | 20 wt % | 255 | 235 | 249.7 | — | — | — | 26.5 |
| | Upper | J-125(*1) | 80 wt % | C(*2) | 20 wt % | 255 | 235 | 249.7 | — | — | — | 26.5 |
| Comparative Example 3 | Lower | J-125(*1) | 60 wt % | D(*3) | 40 wt % | 255 | 230 | 243.7 | — | — | — | 45.2 |
| | Upper | J-125(*1) | 80 wt % | C(*2) | 20 wt % | 255 | 235 | 249.7 | — | — | — | 26.5 |
| Comparative Example 4 | Lower | J-125(*1) | 40 wt % | C(*2) | 60 wt % | — | — | — | 76 | 71 | 73.0 | 60.1 |
| | Upper | J-125(*1) | 90 wt % | C(*2) | 10 wt % | 255 | 238 | 245.8 | — | — | — | 54.1 |

DSC: Differential Thermal Analyzer, Perkin Elmer Model 7
*1 J-125: Crystalline Polyester (inherent viscosity 0.75 dl/g) made by Mitsui Pet K.K.
*2 C: Non-Crystalline Polyester (IA/TA/EG = 50/50/100 mole %, glass-transition temperature 68° C., inherent viscosity 0.85 dl/g) made by Mitsui Pet K.K.
*3 D: Copolyester (TA/CHDM/EG = 100/30/70 mole %, inherent viscosity 0.80 dl/g) made by Eastman Kodak
*4 J-240: Low-Crystalline Copolyester (IA/TA/EG = 10/90/100 mole %, inherent viscosity 0.85 dl/g) made by Mitsui Pet K.K.

TABLE 6

| | Strip-Out Property (Adhesion of Resin to Punch and Releasability of Can) | Inside Face Observed after DI Working | QTV Value mA/can | Copper Sulfate Test (Copper Deposition Observed) | Overall Evaluation |
|---|---|---|---|---|---|
| Example 1 | Good | Good | 0.7 | None | ○ |
| Example 2 | Good | Good | 0.5 | None | ○ |
| Example 3 | Good | Good | 0.5 | None | ○ |
| Example 4 | Good | Good | 0.2 | None | ○ |
| Example 5 | Good | Good | 1.0 | None | ○ |
| Example 6 | Good | Good | 1.1 | None | ○ |
| Comparative Example 1 | Bad | Bad | 50.0 | Yes | X |
| Comparative Example 2 | Good | Bad | 23.0 | Yes | X |
| Comparative Example 3 | Good | Not Good | 18.0 | Yes | X |
| Comparative Example 4 | Not Good | Bad | 34.0 | Yes | X |

○: Excellent
X: Bad

What is claimed is:

1. A process for producing a resin-coated steel sheet for DI cans, comprising:

providing a mixture containing 95 to 5% by weight of a crystalline polyester resin and 5 to 95% by weight of a non-crystalline polyester resin;

reacting said resins, by means of thermal fusion, to produce a thermoplastic polyester resin having an alloying ratio, as represented by one of formulas (a) or (b), of 5 to 50% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin having a monomer composition equal to that of the thermoplastic polyester resin, $T_{m3}$ and $T_{g3}$ are respectively the melting point and the glass-transition temperature, in ° C., of the thermoplastic polyester resin;

coating the thermoplastic polyester resin by means of a T-die onto a chromate-treated side of a steel sheet, which is tin-coated on the other side, wherein said thermoplastic polyester resin as applied on the steel sheet is in non-crystalline condition and is to be converted by DI working into a crystalline resin layer to assure a satisfactory stripping-out property; and cooling the coated resin quickly to prevent further crystallization of the thermoplastic polyester resin.

2. A process for producing a resin-coated steel sheet for DI cans, comprising:

providing a mixture containing 95 to 5% by weight of a crystalline polyester resin and 5 to 95% by weight of a non-crystalline polyester resin;

reacting said resins, by means of thermal fusion, to produce a thermoplastic polyester resin having an alloying ratio, as represented by one of formulas (a) or (b) below, of 20 to 80% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin having a monomer composition equal to that of the thermoplastic polyester resin, $T_{m3}$ and $T_{g3}$ are respectively the melting point and the glass-transition temperature, in ° C., of the thermoplastic polyester resin;

coating the thermoplastic polyester resin by means of a T-die onto one side of a steel sheet which is tin-coated on both sides, wherein said thermoplastic polyester resin as applied on the steel sheet is in non-crystalline condition and is to be converted by DI working into a crystalline resin layer to assure a satisfactory stripping-out property; and cooling the coated resin quickly to prevent further crystallization of the thermoplastic polyester resin.

3. A process for producing a resin-coated steel sheet for DI cans, comprising:

providing a mixture containing a crystalline polyester resin and a non-crystalline polyester resin;

reacting said resins, by means of thermal fusion, to produce a thermoplastic polyester resin having an alloying ratio, as represented by one of formulas (a) or (b) below, of greater than 0% and less than 50% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin having a monomer composition equal to that of the thermoplastic polyester resin, $T_{m3}$ and $T_{g3}$ are respectively the melting point and the glass-transition temperature, in ° C. of the thermoplastic polyester resin;

providing a steel sheet which is tin-coated on both sides and wherein one side is further coated with a non-crystalline polyester resin layer;

coating the thermoplastic polyester resin by means of a T-die onto the non-crystalline polyester resin layer, wherein said thermoplastic polyester resin as applied on said layer is in non-crystalline condition and is to be converted by DI working into a crystalline resin layer to assure a satisfactory stripping-out property; and cooling the coated resin quickly to prevent further crystallization of the thermoplastic polyester resin.

4. A process for producing a resin-coated steel sheet for DI cans, comprising:

providing a mixture containing a crystalline polyester resin and a non-crystalline polyester resin;

reacting said resins, by means of thermal fusion, to produce a thermoplastic polyester resin having an alloying ratio, as represented by one of formulas (a) or (b) below, of not less than 50% and less than 100% where (a) and (b) are as follows:

$$\frac{T_{m1} - T_{m3}}{T_{m1} - T_{m2}} = \text{Alloying ratio} \quad (a)$$

or

-continued $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C. of the crystalline polyester resin, $T_{m2}$ and $T_{g2}$ are respectively the melting point and the glass-transition temperature, in ° C. of a random copolymer of a polyester resin having a monomer composition equal to that of the thermoplastic polyester resin, $T_{m3}$ and $T_{g3}$ are respectively the melting point and the glass-transition temperature, in ° C. of the thermoplastic polyester resin;

coating the thermoplastic polyester resin by means of a T-die onto one side of a steel sheet which is tin-coated on both sides, and further coating the coated thermoplastic polyester resin by means of a T-die with a second crystalline polyester resin, wherein said thermoplastic polyester resin as applied on the steel sheet is in non-crystalline condition and is to be converted by DI working into a crystalline resin layer to assure a satisfactory stripping-out property; and cooling the coated resins quickly to prevent further crystallization of the thermoplastic polyester resin.

5. A process for producing a drawn and ironed can, comprising:

providing a mixture containing 95 to 5% by weight of a crystalline polyester resin and 5 to 95% by weight of a non-crystalline polyester resin;

reacting said resins, by means of thermal fusion, to produce a thermoplastic polyester resin having an alloying ratio, as represented by formulas (a) or (b) below, of 5 to 50% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin having a monomer composition equal to that of the thermoplastic polyester resin, $T_{m3}$ and $T_{g3}$ are respectively the melting point and the glass-transition temperature, in ° C., of the thermoplastic polyester resin;

coating the thermoplastic polyester resin by means of a T-die onto a chromate-treated side of a steel sheet, which is tin-coated on the other side, wherein said thermoplastic polyester resin as applied on the steel sheet is in non-crystalline condition and is to be converted by DI working into a crystalline resin layer to assure a satisfactory stripping-out property;

cooling the coated resin quickly to prevent further crystallization of the thermoplastic polyester resin; and drawing and ironing the resultant resin-coated steel sheet to from a can, with the resin-coated side of the steel sheet forming the inside of the can.

6. A process for producing a drawn and ironed can, comprising:

providing a mixture containing 95 to 5% by weight of a crystalline polyester resin and 5 to 95% by weight of a non-crystalline polyester resin;

reacting said resins, by means of thermal fusion, to produce a thermoplastic polyester resin having an alloying ratio, as represented by one of formulas (a) or (b) below, of 20 to 80% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin a having a monomer composition equal to that of the thermoplastic polyester resin, $T_{m3}$ and $T_{g3}$ are respectively the melting point and the glass-transition temperature, in ° C., of the thermoplastic polyester resin;

coating the thermoplastic polyester resin by means of a T-die onto one side of a steel sheet which is tin-coated on both sides, wherein said thermoplastic polyester resin as applied on the steel sheet is in non-crystalline condition and is to be converted by DI working into a crystalline resin layer to assure a satisfactory stripping-out property;

cooling the coated resin quickly to prevent further crystallization of the thermoplastic polyester resin; and drawing and ironing the resultant resin-coated steel sheet to from a can, with the resin-coated side of the steel sheet forming the inside of the can.

7. A process for producing a drawn and ironed can, comprising:

providing a mixture containing a crystalline polyester resin and a non-crystalline polyester resin;

reacting said resins, by means of thermal fusion, to produce a thermoplastic polyester resin having an alloying ratio, as represented by one of formulas (a) or (b) below, of greater than 0% and less than 50% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin having a monomer composition equal to that of the thermoplastic polyester resin, $T_{m3}$ and $T_{g3}$ are respectively the melting point and the glass-transition temperature, in ° C., of the thermoplastic polyester resin;

providing a steel sheet which is tin-coated on both sides and wherein one side is further coated with a non-crystalline polyester resin layer;

coating the thermoplastic polyester resin by means of a T-die onto the non-crystalline polyester resin layer, wherein said thermoplastic polyester resin as applied on said layer is in non-crystalline condition and is to be converted by DI working into a crystalline resin layer to assure a satisfactory stripping-out property;

cooling the coated resin quickly to prevent further crystallization of the thermoplastic polyester resin; and drawing and ironing the resultant resin-coated steel sheet to from a can, with the resin-coated side of the steel sheet forming the inside of the can.

8. A process for producing a drawn and ironed can, comprising:

providing a mixture containing a crystalline polyester resin and a non-crystalline polyester resin;

reacting said resins, by means of thermal fusion, to produce a thermoplastic polyester resin having an alloying ratio, as represented by one of formulas (a) and (b) below, of not less than 50% and less than 100% where (a) and (b) are as follows:

$$\frac{T_{m1} - T_{m3}}{T_{m1} - T_{m2}} = \text{Alloying ratio} \quad (a)$$

or $$\frac{T_{g1} - T_{g3}}{T_{g1} - T_{g2}} = \text{Alloying ratio} \quad (b)$$

where $T_{m1}$ and $T_{g1}$ are respectively the melting point and the glass-transition temperature, in ° C., of the crystalline polyester resin, $T_{m2}$ and $T_{g2}$ are respectively the melting point and the glass-transition temperature, in ° C., of a random copolymer of a polyester resin having a monomer composition equal to that of the thermoplastic polyester resin, $T_{m3}$ and $T_{g3}$ are respectively the melting point and a glass-transition temperature, in ° C., of the thermoplastic polyester resin;

coating the thermoplastic polyester resin by means of a T-die onto one side of a steel sheet which is tin-coated on both sides, and further coating the coated thermoplastic polyester resin by means of a T-die with a second crystalline polyester resin, wherein said thermoplastic polyester resin as applied on the steel sheet is in non-crystalline condition and is to be converted by DI working into a crystalline resin layer to assure a satisfactory stripping-out property;

cooling the coated resins quickly to prevent further crystallization of the thermoplastic polyester resin; and drawing and ironing the resultant resin-coated steel sheet to form a can, with the resin-coated side of the steel sheet forming the inside of the can.

\* \* \* \* \*